H. JACKSON.
GRINDING, PULPING, AND PULVERIZING MACHINE.
APPLICATION FILED MAR. 13, 1911.

1,083,213.

Patented Dec. 30, 1913.
5 SHEETS—SHEET 1.

WITNESSES

INVENTOR
Harold Jackson

H. JACKSON.
GRINDING, PULPING, AND PULVERIZING MACHINE.
APPLICATION FILED MAR. 13, 1911.

1,083,213.

Patented Dec. 30, 1913.

5 SHEETS—SHEET 2.

WITNESSES

INVENTOR
Harold Jackson

Atty

H. JACKSON.
GRINDING, PULPING, AND PULVERIZING MACHINE.
APPLICATION FILED MAR. 13, 1911.

1,083,213.

Patented Dec. 30, 1913.
5 SHEETS—SHEET 3.

WITNESSES.

INVENTOR
Harold Jackson

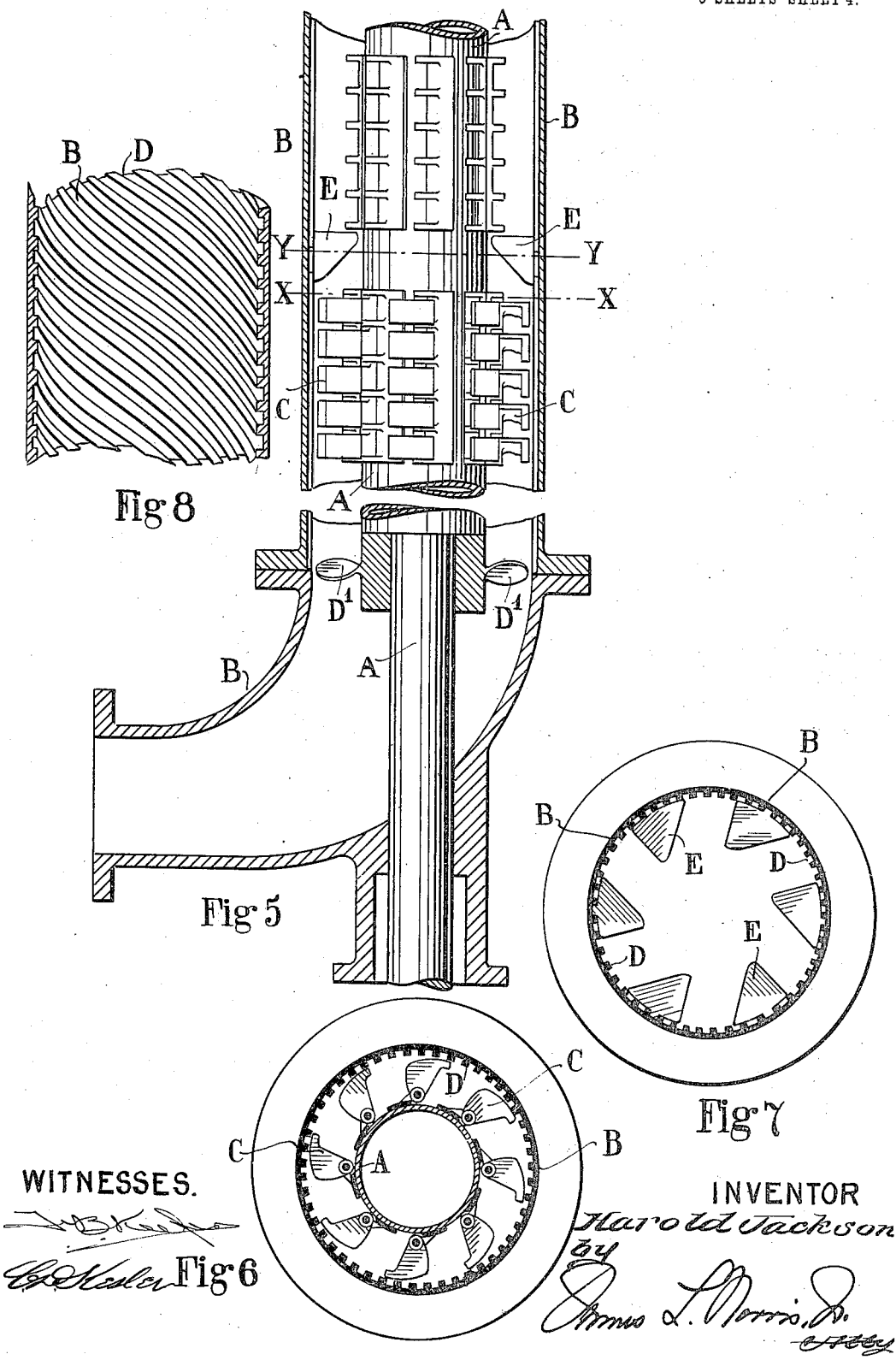

H. JACKSON.
GRINDING, PULPING, AND PULVERIZING MACHINE.
APPLICATION FILED MAR. 13, 1911.

1,083,213.

Patented Dec. 30, 1913.
5 SHEETS—SHEET 5.

WITNESSES

INVENTOR
Harold Jackson

UNITED STATES PATENT OFFICE.

HAROLD JACKSON, OF GARSTANG, ENGLAND.

GRINDING, PULPING, AND PULVERIZING MACHINE.

1,083,213.  Specification of Letters Patent.  Patented Dec. 30, 1913.

Application filed March 13, 1911.  Serial No. 614,166.

*To all whom it may concern:*

Be it known that I, HAROLD JACKSON, a British subject, residing at Garstang, county of Lancaster, England, have invented certain new and useful Improvements in Grinding, Pulping, and Pulverizing Machines, of which the following is a specification.

This invention relates to apparatus for pulping, pulverizing or similarly treating substances such as fibers for paper pulp, requiring to be finely ground or pulped in a wet or semi-liquid state.

It consists essentially of a machine wherein the pulp is subjected to a compound mechanical treatment comprising a combined vibratory tapping or hammering and a rubbing or dragging action between a ribbed surface and relatively movable beaters.

Figure 1:
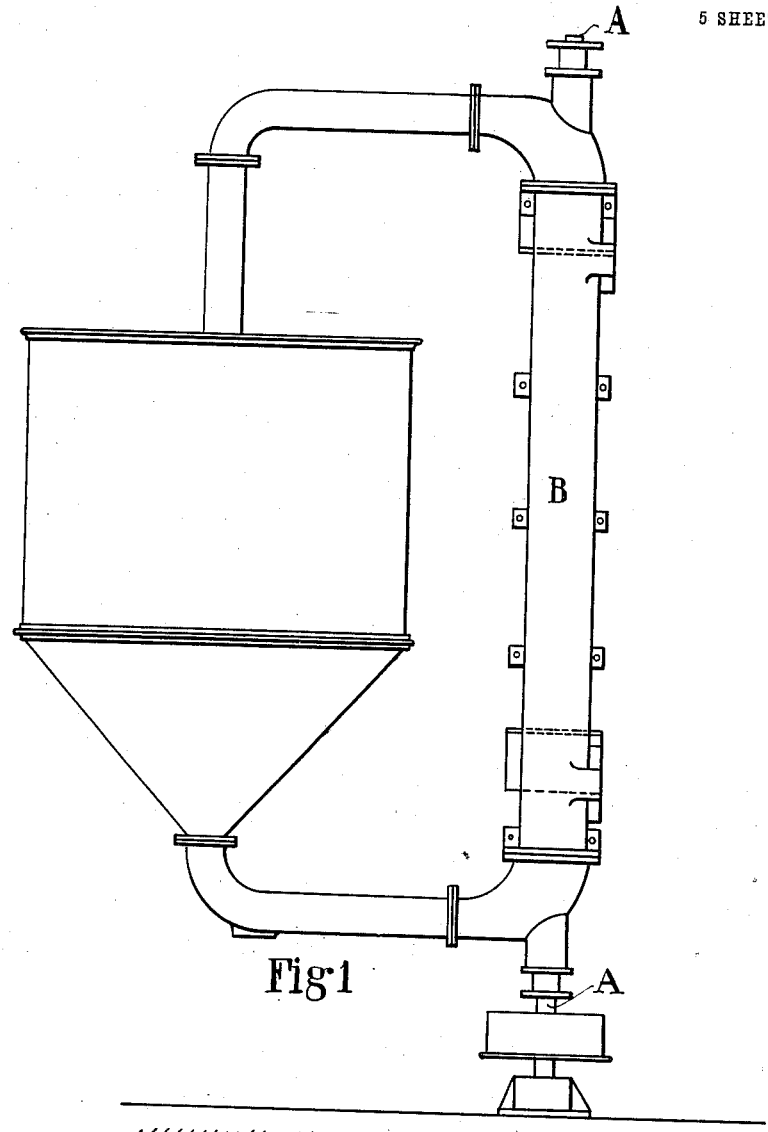
Figure 2:
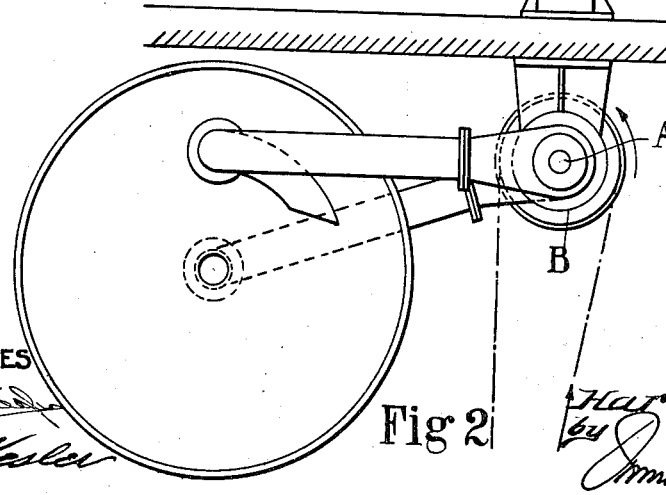
Figure 3:
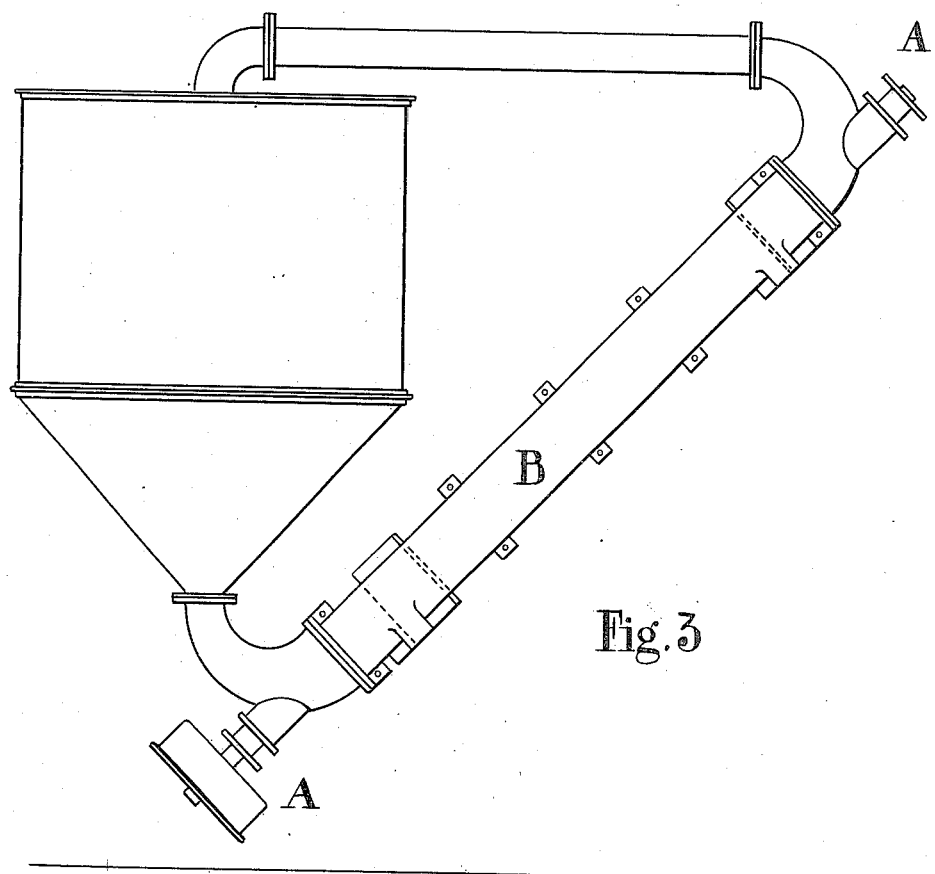
Figure 4:
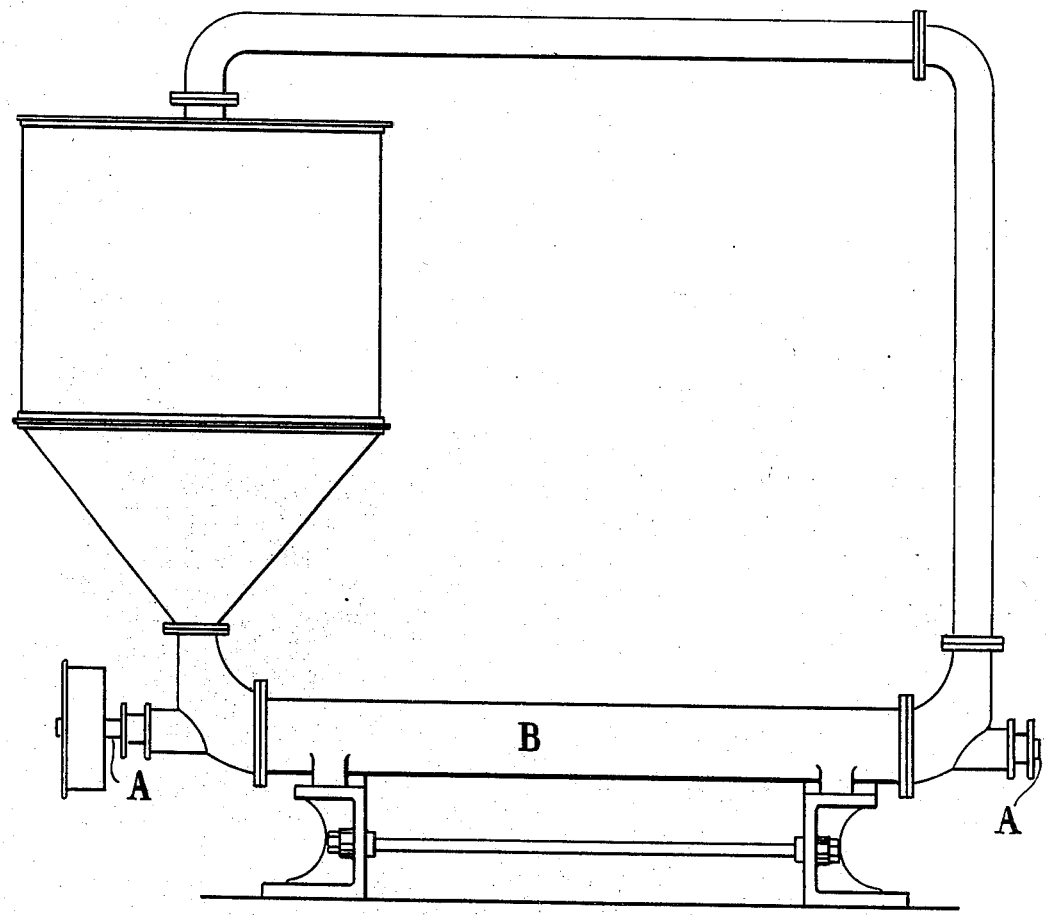
Figure 9:
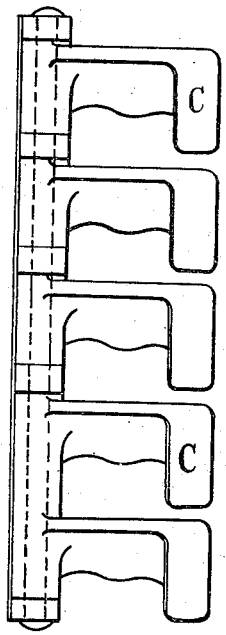
Figure 11:
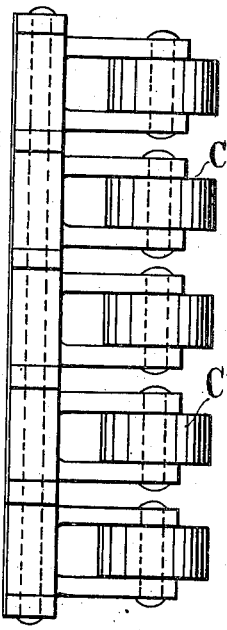
Figure 13:
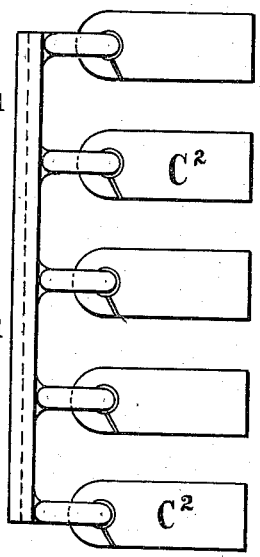
Figure 15:
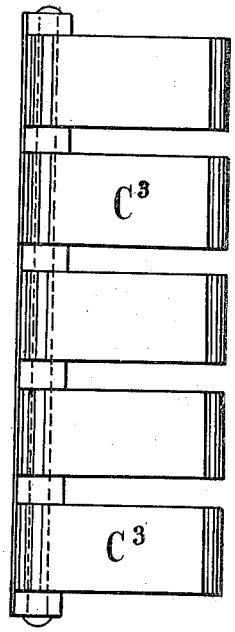
Figure 10:
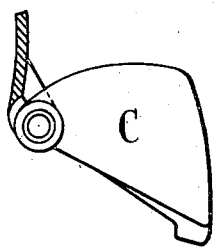
Figure 12:
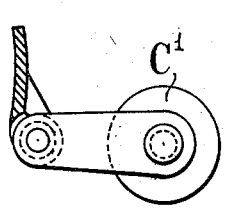
Figure 14:
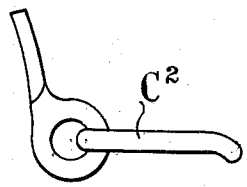
Figure 16:
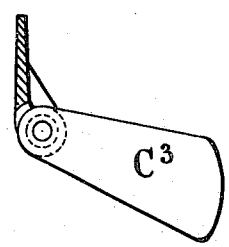

In the accompanying drawing:—Figure 1 is a side elevation of the improved machine; Fig. 2 is a plan view thereof; Fig. 3 is a side elevation of a similar machine set inclined; Fig. 4 is a side elevation of a similar machine set horizontal; Fig. 5 is an enlarged vertical section of part of the machine; Fig. 6 is a transverse section on line $x$—$x$, Fig. 5; Fig. 7 is a transverse section on line $y$—$y$, Fig. 5; Fig. 8 is a sectional elevation showing spiral ribs; Figs. 9 and 10 are, respectively, a side elevation and a plan view of one form of beater; and Figs. 11 to 16 are corresponding views of other forms of beaters.

The machine is constructed with a rotor A and a casing B, comprising complemental parts, one of which is provided with movable beaters C and the other with coacting ribs or projections D.

The beaters C are affixed radially or tangentially to the part by which they are carried, in the present instance, the rotor, and may be arranged in rows or spirally. They are preferably pivoted to such part, and may be in the form of blades with flat, or hammer-shaped ends, as shown in Figs. 5, 6, 9 and 10, or of swinging arms provided with rollers C', as in Figs. 11 and 12, or of links or flat blades C², as in Figs. 13 and 14, or of solid blocks C³, as in Figs. 15 and 16.

The part with which the beaters coact is provided with the aforementioned ribs or projections D. These ribs or projections are set closely together, and may be arranged either parallel to the longitudinal axis of the part whereon they are provided, as in Fig. 5, or spirally around it, as in Fig. 8, or in any other desired manner.

The rotor may be fitted with a screw propeller D' to force the material through the casing, and the latter may be provided, in turn, with inclined vanes or blades E which also assist in conveying the material upward or forward as it is carried around by the beaters. The semi-liquid material may be circulated through the casing by means of a suitable pump, or the like, and may be caused to pass from said casing into a hopper G, and thence back into the casing.

The apparatus may be arranged vertically, as in Figs. 1 and 5, or it may be either inclined, as in Fig. 3, or horizontally arranged as in Fig. 4. The rotor is run at a speed which is most suitable for the semi-liquid material being treated, and it produces a compound mechanical treatment of the fibers comprising a simultaneously exerted or combined gentle hammering or tapping and a rubbing or dragging action, as the beaters successively jump from one rib or projection to the next.

I claim as my invention:—

1. Apparatus for finally treating ground paper pulp consisting of a casing, and a rotor revoluble therein and having a plurality of beaters pivotally connected thereto, said beaters being operable by centrifugal force to act directly against the sides of the casing.

2. Apparatus for finally treating ground paper pulp consisting of a casing, and a rotor revoluble therein, said casing and rotor constituting companion parts, one of which parts is provided with a series of pivotally mounted beaters operable by centrifugal force to act directly against the adjacent surface of the other part.

In testimony whereof I have hereunto set my hand in presence of two subscribing witnesses.

HAROLD JACKSON.

Witnesses:
  I. OWDEN O'BRIEN,
  HARRY BARNFATHER.